United States Patent Office 3,240,650
Patented Mar. 15, 1966

3,240,650
BONDING OF POLYETHYLENE TEREPHTHALATE FIBERS TO NATURAL RUBBER AND BUTADIENE-STYRENE SYNTHETIC RUBBER
Everett C. Atwell, Greensboro, N.C., assignor to Burlington Industries, Inc., Greensboro, N.C., a corporation of Delaware
No Drawing. Filed Nov. 22, 1960, Ser. No. 70,917
5 Claims. (Cl. 156—315)

The present invention relates to certain improvements in the bonding of natural rubber and/or butadiene-styrene synthetic rubber to polyethylene terephthalate fibers.

The difficulties involved in obtaining good adhesion between various types of rubber, e.g., natural rubber and butadiene-styrene rubbers such as GR–S, and polyethylene terephthalate fibers are well known in the art and numerous proposals have been made for obtaining an improved bond. However, there is still a real need for new methods and techniques which will provide optimum adhesion between these materials.

Accordingly, the principal object of the present invention is to provide a method of bonding natural rubber and/or butadiene-styrene rubber, to polyethylene terephthalate fibers whereby remarkably outstanding adhesion is obtained. A more specific object of the invention is the provision of a unique pretreatment for polyethylene terephthalate fibers to facilitate increased adhesion to natural rubber and/or butadiene-styrene rubber. Other objects of the invention will also be hereinafter apparent.

Broadly stated, the invention contemplates the use of two specific primers which, when used consecutively in the manner described give a surprisingly high bonding effect between the indicated rubbers, or compositions containing same, and polyethylene terephthalate. The first of these primers comprises an organic polyisocyanate such as methylene bis (4-phenylisocyanate). The second primer is an aqueous composition comprising an emulsion or dispersion of a vinylpyridine-butadiene-styrene terpolymer latex and a partially condensed resorcinol-formaldehyde reaction product, particularly the base catalyzed resole described in my copending applications Serial No. 42,956 or Serial No. 49,179, the subject matter of which is incorporated herein by reference.

The reasons for the unique results obtained herein are not fully understood. However, it is apparent that the two primers are mutually adhesive and coact in some unusual way to give a degree of bonding which is significantly in excess of the expected additive effect based on the use of each primer, separately. As a matter of fact, treatment of the polyethylene terephthalate with either of the primers alone does not result in any commercially important increase in adhesion above that found between untreated polyethylene terephthalate and the indicated rubbers whereas, under otherwise comparable conditions, the method of the present invention increases the adhesion to a commercially significant value which may be many times greater than the adhesion between the untreated materials. The results of the invention also appear to be specific to the indicated types of rubbers, i.e., natural rubber and/or butadiene-styrene rubber, since the dual primers of the invention do not give this improved degree of bonding between polyethylene terephthalate fibers and other rubbers.

In carrying out the present process, the polyethylene terephthalate fibers in yarn, fabric, or other form, are first impregnated with the organic polyisocyanate. For this purpose, there is used a solution of the polyisocyanate in moisture-free organic solvent, e.g., chlorinated or alkylated aromatics such as monochlorobenzene; xylene or toluene. While the amount of isocyanate can be widely varied, it is usually desirable to apply a minimum of 0.5% polyisocyanate solids based on the weight of dry polyethylene terephthalate fibers. An economical and usually practical level is 2.0 to 2.5%. A maximum of 5% is usually in excess and does not provide further improvement.

As indicated above, methylene bis (4-phenylisocyanate) is a typical polyisocyanate suitable for priming polyethylene terephthalate fibers according to the invention. Monoisocyanates are unsatisfactory but other organic polyisocyanates which may be used are polymethylene polyphenyl polyisocyanate having the formula:

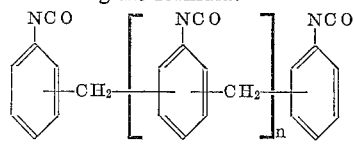

wherein $n$ is an integer, e.g., the product known as PAPI–1 (Carwin Company), in which $n$ has an average value of 1; Mobay's toluene diisocyanate polymer Mondur CB–60; triphenylmethane triisocyanate (Mondur TM); 3,3-dimethoxyl-4,4'-biphenylene diisocyanate; and p,p'-diphenylmethane diisocyanate (Mondur MO).

After the polyisocyanate has been applied as the first primer, the treated polyethylene terephthalate fibers are dried for solvent removal prior to application of the second primer. Usually, the treated material is heated until dry, using temperatures between 200–300° F. The dried, isocyanate treated polyethylene terephthalate fibers may then be treated, either immediately or after storage, with the second primer of the invention. Advantageously, the dried isocyanate-treated material is tack-free and may be rolled up and stored without need for subsequent reactivation of the primer and without detriment to the working properties of the material.

As indicated heretofore, the second primer comprises an aqueous emulsion or dispersion of vinyl-pyridine-butadiene-styrene terpolymer latex and a resole according to my above-mentioned application Serial No. 42,956, now U.S. Patent No. 3,030,230, and Serial No. 49,179. This primer may be prepared as described in said applications by substituting the indicated terpolymer for the butadiene-acrylonitrile latex used in said applications. It is also possible to include an organic solvent in this primer although organic solvent-free aqueous compositions are preferred. Additional components, e.g., zinc oxide and/or softening, wetting and antifoaming agents, etc., may also be included in this primary composition, if desired.

A particularly desirable vinylpyridine-butadiene-styrene terpolymer latex for use herein is that available under the trade name "Gentac" (General Tire). Other equivalent terpolymers for use herein are available as Hycar 2518 (Goodrich) and Pyratex B (Naugatuck). These terpolymers may comprise, in parts by weight, from 50 to 95 parts butadiene, 5 to 50 parts vinylpyridine and, per 100 parts of butadiene/vinylpyridine, from 5 to 30 parts styrene. Typically suitable terpolymers for use herein are described in Mighton 2,561,215; Cislak et al. 2,402,020 and Wilson 2,652,353.

According to a further feature of the invention, the terpolymer latex may be modified, if desired, by the addition thereto of a butadiene-styrene copolymer latex, e.g., SBR latex, to cut down on the amount of terpolymer utilized. The butadiene-styrene copolymer latex, however, should not exceed more than 75% of the latex solids. In other words, the terpolymer should comprise from 25 to 100% by weight of the latex solids of the second primer for effective bonding.

The latex/resole composition may be applied to the isocyanate-treated polyethylene terephthalate fibers in any convenient fashion, e.g., by dipping, padding or spraying. The amount of resole/latex primer applied to the polyethylene terephthalate fibers will vary depending, for example, upon the weight and construction of the polyethylene terephthalate material. Typically, the amount of add-on solids to be applied will be at least 5% by weight of the fibers with 15% a practical upper limit although higher percentages, for example 30% or even more, may be used. In any event, it will be realized that the specific amount of add-on solids necessary to give maximum mutual bonding will vary from one situation to another. Usually, the ratio of resole to latex solids, in parts of solids by weight, will come within the range of from about 1:12 to 1:2.5, preferably 1 part resole solids per 3.5 to 10 parts latex solids.

After impregnation, the water should be removed from the goods by drying. Various drying temperatures and drying rates may be used so long as the fibrous material is completely dried.

The dried, dual primed polyethylene terephthalate prepared in the manner described above, is also characterized by its non-tacky nature and can be rolled up and stored for long periods of time without losing its bonding affinity for the rubber. As will be appreciated, this represents an outstanding advantage since the dried fibrous material can be stored until the rubber is to be applied thereto. A unique feature of the dried material is that, even after long storage, no reactivation of the treated fabric surface is necessary for effective bonding with rubber. This is in contrast to known adhesive treated fabrics wherein reactivation, for example, by organic solvent treatment or water, is essential to effect bonding after storage.

The dual primed polyethylene terephthalate fibers, in fabric form or otherwise, may be bonded to any vulcanizable natural rubber or butadiene-styrene rubber composition, e.g., conventional hose or tire stock. These compositions will usually have the following representative makeup:

|   | Parts |
|---|---|
| Smoked sheet rubber or GR–S | 100 |
| Zinc oxide | 5–20 |
| Sulfur | 2–3 |
| Stearic acid | 1 |
| Accelerator | 1–2 |

The rubber may be applied to the dual treated polyethylene terephthalate in conventional fashion. Thus, for example, natural rubber compounded in sheet form, typically ordinary hose stock or tire stock, for example, may be pressed against the dual primed polyethylene terephthalate fabric prepared according to the invention and vulcanized under conventional conditions (e.g., 290° F. to 300° F. and desirably 125 to 250 p.s.i. pressure for 30 to 45 minutes).

The invention is illustrated, but not limited, by the following examples wherein parts and percentages are by weight unless otherwise stated:

EXAMPLE I

This example describes the preparation of a suitable resole/latex composition suitable for use herein as the second primer.

RESOLE/LATEX PRIMER

Part A

|   | Parts |
|---|---|
| Resorcinol | 5.1 |
| 37% formaldehyde | 6.5 |
| NaOH flakes | .15–.30 |
| Water | 110 |
| (6.25% resin solution), approximately | 122 |

Part B

|   | Parts |
|---|---|
| 6.25% resin solution (Part A) | 19.6 |
| 41% Gentac latex | 26.0 |
| 10% Triton X–100 solution | 1.26 |
| Water | 53.14 |
|   | 100 |

*Preparation of Part A*

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the bonding composition (Part B).

*Preparation of Part B*

The Gentac latex was measured into a mixing tank with stirring. The Triton solution was added and the water and resin solution (Part A) were then slowly added.

The resulting dispersion was ready for immediate use but may be stored for a limited time (about 2 days) at room temperature, or, for prolonged periods of time under refrigeration.

EXAMPLE II

The resole/latex primer of Example I was also prepared by repeating Example I except that Part A of the bonding composition was prepared in two separate stages. First, a so-called "arrested resin solution" was prepared using the following proportions:

|   | Parts |
|---|---|
| Resorcinol | 5.1 |
| NaOH flakes | .3 |
| 37% formaldehyde | 2.15 |
| Water | 4.9 |
| Total | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours for the Part A composition of Example I.

The required amount of the arrested resin solution (12.45 parts) was transferred from the storage drum to the reaction tank. To this arrested resin solution was added 4.3 parts of 37% formaldehyde and 108 parts of water, the water being added first, with agitation. The resulting mixture was aged for from 1–6 hours at 80–84° F.

After the ageing period, a dispersion with Gentac latex was prepared as in Example I.

EXAMPLE III

This example illustrates preparation of a dual primed polyethylene terephthalate fabric and the bonding thereof to a natural rubber composition.

A first primer was prepared by dissolving sufficient methylene bis (4-phenylisocyanate), (Hylene M–50, for example), in xylene freed from moisture to provide a 6% solids solution.

A piece of 5 oz. polyethylene terephthalate (Dacron) fabric was then padded through the xylene solution so as to leave 2.1% Hylene solids on the cloth. The fabric was dried at 220° F. for solvent removal.

The thus treated fabric was then run through a 12% aqueous dispersion or emulsion of second primer, namely, the product of Example II (prepared from "arrested master"), and the pad squeeze rolls. This was done two times so as to get a solids add-on of 12–15%. The fabric was dried at 220° F. after each passage through the squeeze rolls. The dried fabric was then subjected to a final cure of 5 minutes at 320° F. to remove all traces of moisture and to fully polymerize and cross link the resin/latex solids. This curing step is preferred but may be omitted with some resultant loss in potential adhesion.

A conventionally compounded natural rubber (Goodyear) sheet (tire stock .040 inch thick) was then pressed into contact with the dual primed fabric and vulcanized at 290° F. for 30 minutes.

It had previously been ascertained that the adhesion between the unprimed Dacron fabric and the rubber sheet was only about 3–5 pounds per inch width on a peel test when the test jaws were separated at a rate of 2" per minute. The adhesion using only the polyisocyanate primer of this example was about 5 pounds per inch and with the latex/resole second primer alone, only 3.5–4 pounds per inch. In contrast, however, the fabric processed in the manner of the example using both primers as indicated exhibited fabric adhesion to the rubber of 41–41.5 pounds per inch width. Essentially equivalent results were obtained using the product of Example I as the second primer.

EXAMPLE IV

Example III was repeated for the purpose of bonding natural rubber to polyethylene terephthalate fabric except that a 9% solution of Hylene M–50 product in xylene was used as the first primer with a solids add-on of 3.0%. The resulting adhesion was 56–61 pounds after two passes with the second primer and 37–46 pounds with just one pass.

EXAMPLE V

Example III was repeated except that the second primer had the following composition:

|   | Parts |
|---|---|
| 6.25% Resin solution (Part A) | 19.6 |
| 41% Gentac latex | 13.0 |
| 41% SBR latex | 13.0 |
| 10% Triton X–100 solution | 1.26 |
| Water | 53.14 |
|   | 100 |

The resulting adhesion between the natural rubber and polyethylene terephthalate was about 67 pounds.

EXAMPLE VI

A piece of 5 oz. polyethylene terephthalate fabric was padded through a 5% solids solution of methylene bis (4-phenylisocyanate) in xylene so as to leave about 1.7% polyisocyanate solids on the cloth. The fabric was dried at 220° F. and then passed through the second primer of Example I and the pad squeeze rolls to get a solids add-on of 12–15%. The fabric was dried at 220° F. and then cured at 320° F. for 30 minutes.

A sheet of compounded GRS rubber (Goodyear) was then pressed on the fabric and vulcanized at 290° F. for 30 minutes. In contrast to a maximum of about 5 pounds adhesion without any primer or with only one of the primers, the adhesion amounted to 41–45 pounds using both primers as discussed above.

It is to be emphasized that the unique results of the invention are dependent upon the use of two primers as described herein, and particularly in the order indicated. While primer systems using vinylpyridine polymers have previously been proposed (see, for example, the above noted patents as well as Salem 2,766,164), the dual primers of the present invention give significantly better results when used in the manner indicated on natural rubber and/or synthetic rubbers comprising butadiene and styrene as evidenced by the comparative data noted above. In said Salem patent, for example, a single primer of vinylpyridine/diolefin copolymer latex is used to promote adhesion to a film deposited from an anhydrous organic solvent containing a rubbery polymer of a conjugated diolefin, preferably with a heat convertible phenol resin added and an isocyanate. In this patented process, which is representative of prior work, the rubber film must be applied as soon as possible after priming in order to obtain effective adhesion. In contrast, the present invention promotes adhesion to a film of either natural rubber or the similar synthetic copolymer of butadiene and styrene using the polyisocyanate primer first and then the primer which contains the vinyl terpolymer resin of butadiene, styrene and vinylpyridine, and the elastomer film can be applied to the dual primed fabric at any time thus permitting the primed material to be stored for as long as may be desired without diminution of the adhesive characteristics. In fact, as noted above, the second primer of the invention may also be applied to the single primed material whenever convenient so that both the single and double primed materials of the invention can be stored for later sale or use.

The desirability of using the polyisocyanate primer followed by the resole/terpolymer primer as proposed herein is evidenced by the following test:

A piece of Dacron fabric, as before, was first primed with the resole/terpolymer primer latex of the present invention, dried and cut in half, one half being left as is and the other half cured for 5 minutes at 320° F. Both pieces were then padded through 9% solution of Hylene M–50 solids, dried and tested for adhesion to tire stock as outlined heretofore. The results showed adhesion of 28–30 pounds per inch width for the uncured fabric and 17½–19 pounds per inch width for the cured fabric. Thus, while the reverse sequence gives some improvement over no treatment or the resole/terpolymer primer alone, the improvement is only about 50% of that obtained using the polyisocyanate primer first followed by the resole/terpolymer primer under otherwise comparable conditions.

It will be appreciated that various modifications may be made in the invention described herein. For instance, any of the other organic polyisocyanates referred to above may be substituted for the Hylene M–50 utilized in the foregoing examples. Accordingly, the scope of the invention is defined in the following claims wherein:

I claim:

1. In a process for bonding polyethylene terephthalate fibers to a rubber selected from the group consisting of natural rubber and butadiene-styrene rubber, the improvement which comprises first treating said polyethylene terephthalate fibers with an organic solvent solution of an organic polyisocyanate selected from the group consisting of (a) polymethylene polyphenyl polyisocyanate of the formula

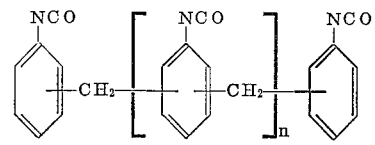

where $n$ has a value of 1; and (b) toluene diisocyanate polymer; drying the thus treated polyethylene terephthalate fibers, then treating said fibers with an aqueous organic solvent-free composition including a resole, a butadiene-styrene copolymer latex and a vinylpyridine-butadiene-styrene terpolymer latex comprising 25—100% by weight of latex solids, said composition having a ratio of resole to latex solids within the range of about 1:12 to 1:2.5 and again drying the thus treated material, said treating and drying steps preceding the application of the rubber to said polyethylene terephthalate, the amount of polyisocyanate applied to said polyethylene terephthalate being at least 0.5%, based on the weight of dry fibers and the amount of latex/resole composition being at least 5%, based on the weight of dry fibers.

2. In a process for bonding polyethylene terephthalate fibers to a rubber selected from the group consisting of natural rubber and butadiene-styrene rubber, the improvement which comprises first treating said polyethylene terephthalate fibers with an organic solvent solution of an organic polyisocyanate selected from the group consisting of (a) polymethylene polyphenyl polyisocynanate of the formula

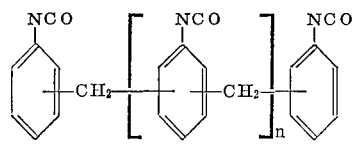

where $n$ has a value of 1; and (b) polytoluene diisocyanate; drying the thus treated polyethylene terephthalate fibers, then treating said fibers with an aqueous organic solvent-free composition including a resole and a vinyl-pyridine-butadiene-styrene terpolymer latex comprising 25-100% by weight of latex solids, said composition having a ratio of resole to latex solids within the range of about 1:12 to 1:2.5 and again drying the thus treated material, said treating and drying steps preceding the application of the rubber to said polyethylene terephthalate, the amount of polyisocyanate applied to said polyethylene terephthalate being at least 0.5%, based on the weight of dry fibers and the amount of latex/resole composition being at least 5%, based on the weight of dry fibers.

3. The process of claim 2 wherein said rubber is natural rubber.

4. The process of claim 2 wherein said rubber is butadiene-styrene rubber.

5. The process of claim 2 including the further step of applying said rubber to the dried, dual treated polyethylene terephathalate fibers and then vulcanizing the same.

References Cited by the Examiner

UNITED STATES PATENTS

| Re. 23,451 | 1/1952 | Mighton | 161—227 |
|---|---|---|---|
| 2,676,164 | 4/1954 | Charlton et al. | 154—180 |
| 2,902,398 | 9/1959 | Schroeder | 156—315 |
| 2,938,823 | 5/1960 | Salem | 161—231 X |
| 2,990,313 | 6/1961 | Knowles et al. | 154—139 |
| 2,991,258 | 7/1961 | Haward et al. | 260—43 |
| 3,090,716 | 5/1963 | Stevens | 156—331 |

FOREIGN PATENTS 595,290   12/1947   Great Britain.

EARL M. BERGERT, *Primary Examiner.*

CARL F. KRAFFT, *Examiner.*